Nov. 11, 1969     W. F. LALOR     3,477,174
METHOD AND APPARATUS FOR FLAME CULTIVATING ROW CROPS
Filed Aug. 28, 1967     3 Sheets-Sheet 1

INVENTOR
WILLIAM F. LALOR

BY *Rudolph R. Russell*

ATTORNEY

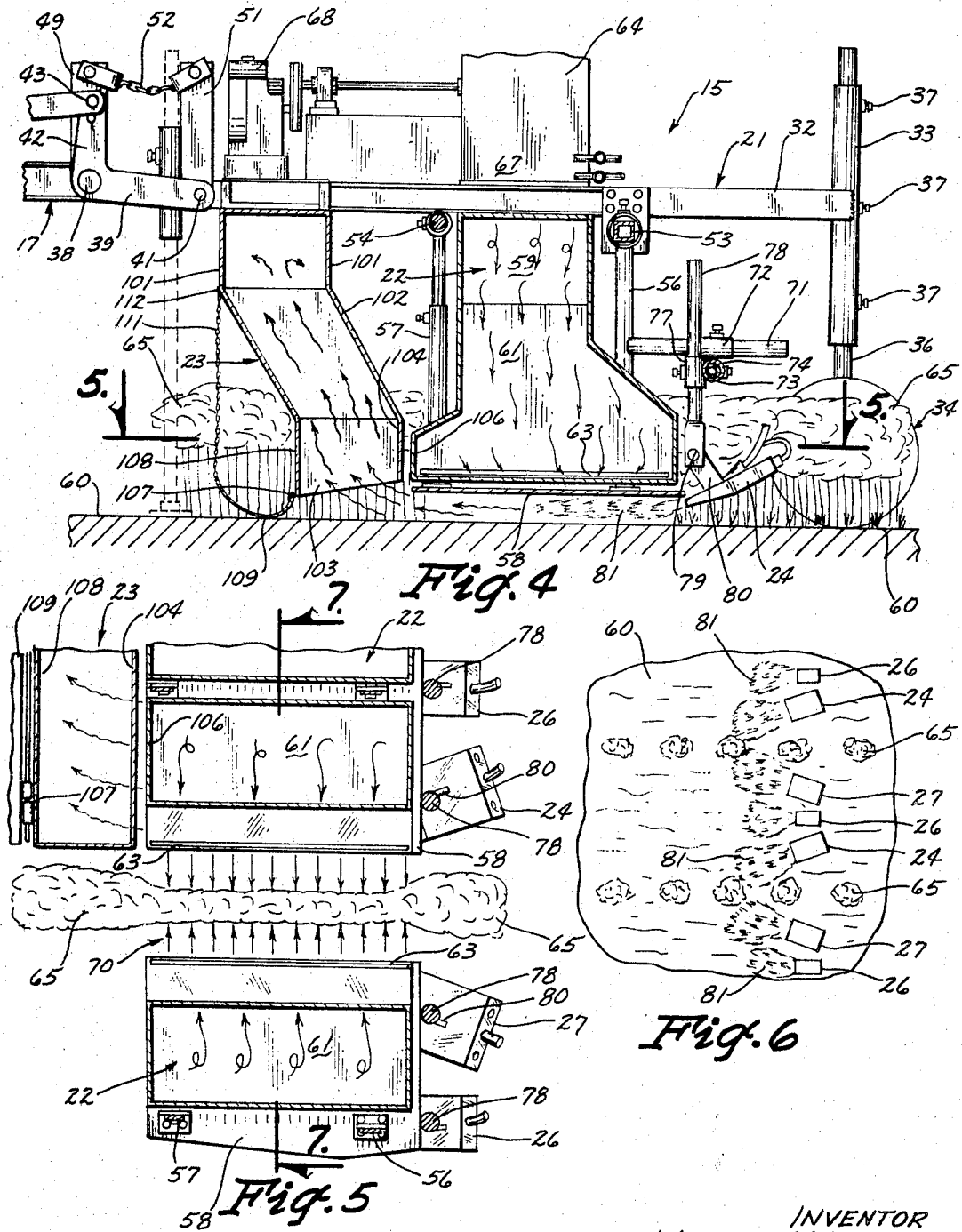

INVENTOR
WILLIAM F. LALOR

BY Rudolph P. Powell

ATTORNEY

United States Patent Office 3,477,174
Patented Nov. 11, 1969

3,477,174
METHOD AND APPARATUS FOR FLAME
CULTIVATING ROW CROPS
William F. Lalor, Ames, Iowa, assignor to Iowa State
University Research Foundation, Inc., Ames, Iowa, a
corporation of Iowa
Filed Aug. 28, 1967, Ser. No. 663,587
Int. Cl. A01m 15/00
U.S. Cl. 47—1.44                                    9 Claims

ABSTRACT OF THE DISCLOSURE

A portable frame adapted to travel along adjacent plant rows carries at its front end a pair of burners corresponding to each plant row. The burners of each pair of burners are arranged at opposite sides of a corresponding row to project the flames therefrom rearwardly and in a generally converging relation about the base of the plants in the row. Mounted on the frame, rearwardly of and corresponding to each pair of burners, is a pair of elongated air discharge nozzles. The nozzles in a pair of nozzles are located at opposite sides of and extended longitudinally of a row with the air streams therefrom directed toward the base of the lower most leaves of the plants to form an air curtain extended longitudinally of a row. This air curtain thermally insulates the plant leaves from the burner flames while acting concurrently to confine the flame heat adjacent to the base of the plants. To weed or flame cultivate different type plants at varying growth stages the velocity and direction of the air streams is controlled relative to the direction of the flames to concentrate the heat of the flames in a desired zone relative to the weeds to be removed. Additional burners on the frame are utilized to flame cultivate the central area between adjacent rows. To concentrate the heat from the burners between the rows a horizontal deflector plate extended longitudinally between adjacent rows is projected rearwardly of the burners at a position above the burner flames and below the air curtain.

SUMMARY OF THE INVENTION

The method and apparatus of this invention provides for a concentration of heat in the region where the weeds are located, namely, adjacent the plants in a row and between the rows, concurrently with protecting the plants from heat damage. The flames are directed downwardly and substantially rearwardly toward the base of the plants while in a covered relation with horizontal heat deflecting plates. Cultivation over an uneven ground surface can thus be safely undertaken since the zone of heat concentration is not substantially changed or affected by flame bounce. The air curtain extended between and above adjacent deflecting plants functions to concentrate the heat in the weed zones along with setting up a thermal insulating wall and a cooling air blanket for the plant leaves and an air shield for counteracting field winds tending to disperse or disrupt the heat concentration.

The transversely opposed air streams or jets in an air curtain flow one against the other in the immediate region of the crop row to produce resultant upward and downward air currents. The upward air currents tend to lift the plant leaves above the heat zone and the downward air currents tend to reduce, by diffusion, the heat intensity at the base of the plant.

Since the flame intensity and direction, the velocity and direction of the air streams and the rate of advance of the cultivator are relatively variable, a desired heat concentration for flame weeding, relative to the type and growth stage of the plants in a row, is readily obtainable. As a result plants varying in height from six to ten inches may be safely flame cultivated in contrast to prior flame cultivating methods requiring plants to be over twelve inches high.

DETAILED DESCRIPTION OF THE INVENTION

Further objects, features and advantages of this invention will become apparent from the following description when taken in connection with the accompanying drawings in which:

FIG. 4 is a sectional view as seen along the line 4—4 in FIG. 1;

FIG. 5 is a sectional view taken along the line 5—5 in FIG. 4;

FIG. 6 is a diagrammatic view showing the arrangement of the burner units relative to the plants in a row;

Figures 1, 2, 3:
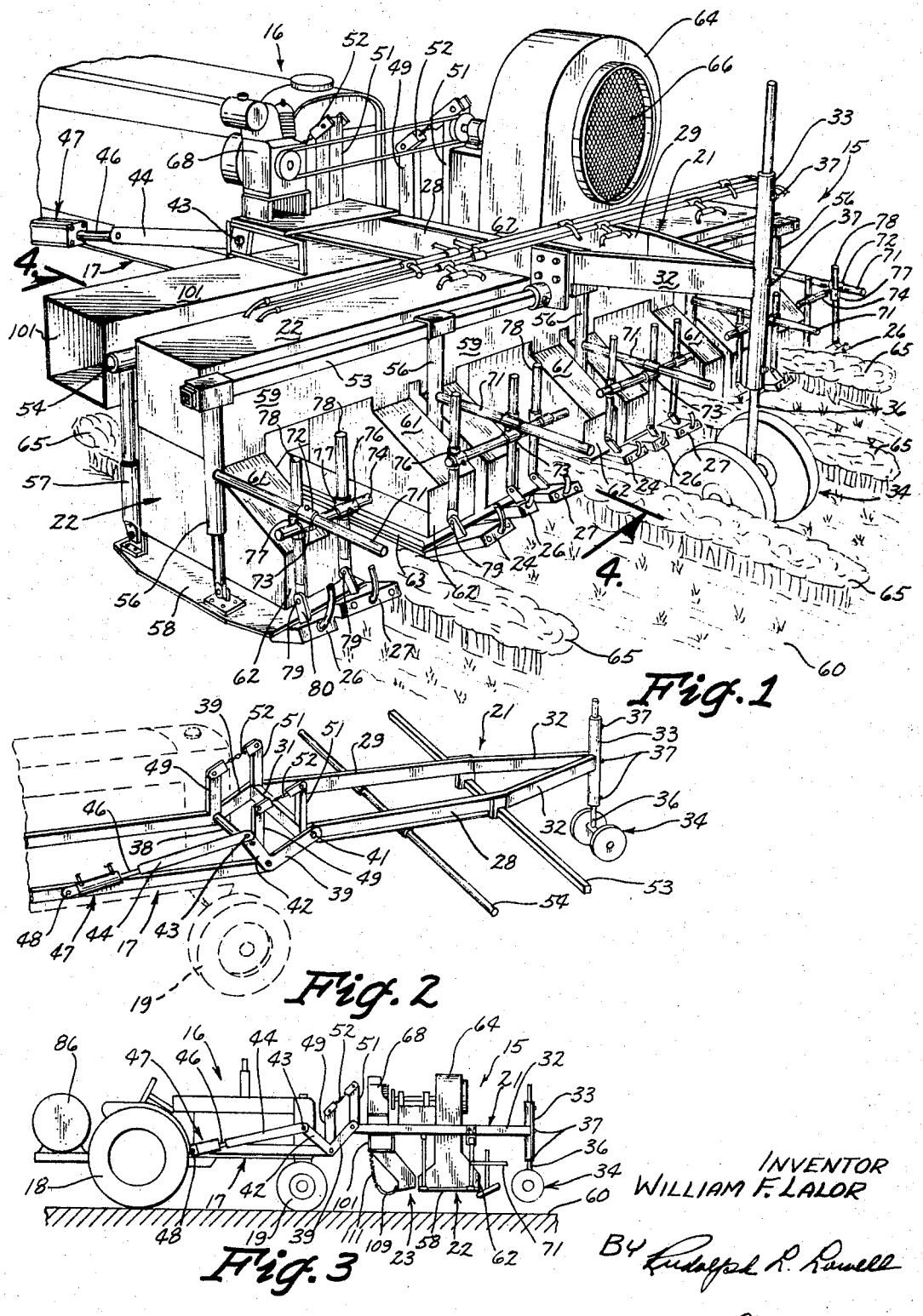
FIG. 1 is a front perspective view of the flame cultivator of this invention shown in assembly relation with a tractor.
FIG. 2 is a reduced perspective view showing the support of the cultivator frame on the front end of the tractor.
FIG. 3 is a reduced side elevational view of the cultivator and tractor assembly showing the cultivator in transport position.

Referring to the drawings the flame cultivator of this invention, designated generally at 15, is shown in FIGS. 1 and 3 in assembly relation with and supported at a forward position on a usual farm tractor 16 having a main frame 17, traction wheels 18 and front steering wheels 19. The cultivator 15 includes a main frame 21 extended forwardly from and longitudinally of the tractor. Carried on the cultivator frame 21 is an air duct assembly 22 for forming air curtains over adjacent rows of plants that are traversed by the cultivator. A heat exhaust duct assembly 23, located rearwardly of the air duct assembly 22 and in a parallel relation therewith, gathers the residual heat resulting from the flame cultivating operation for distribution laterally to opposite sides of the tractor at positions above the plants in a row. Burner units 24, 26 and 27 are located adjacent the forward lower side of the air duct assembly 22 and function to direct flames rearwardly and below the air curtains produced by the air duct assembly 22.

As shown in FIGS. 2 and 3, the cultivator main frame 21 includes a pair of longitudinally extended side members 28 and 29 that are connected together at their rear ends by a transverse connecting member 31. Forward extension 32 on the side members 28 and 29 converge in a forward direction for connection at their front ends with an upright tubular support 33. A wheel assembly 34 for supporting the front end of the cultivator frame 21, is provided with an upright standard or leg 36 that is telescopically received within the tubular sleeve 33 for relative vertical adjustment. An adjusted position of the leg 36, and in turn of the wheel assembly 34, is maintained by friction screws 37 threadable in the tubular sleeve 33 into frictional engagement with the leg 36.

The rear end of the cultivator frame 21 is pivotally supported on the tractor by means including a transverse rock shaft 38 (FIG. 2) rotatably mounted on the front end of the tractor frame 17. A pair of transversely opposite rock arms 39 carried on the rock shaft 38, for rocking movement therewith, have their free ends pivoted 41 to the rear end of the cultivator frame 21. A third rock arm 42, which forms a bell crank with one of the rock arms 39, is pivotally connected at 43 to the forward end of a lift link 44 that constitutes a front extension for the piston rod 46 of a hydraulic cylinder assembly 47. The rear end of the cylinder assembly 47 is pivoted at 48 on the tractor frame 17.

Projected upwardly from the tractor frame in transverse alignment with the rock shaft 38 are a pair of transversely spaced upright legs 49. Corresponding to the legs 49 and carried at the rear end of the cultivator frame 21 in transverse alignment with the pivots 41 are a pair of upright front legs 51. The upper ends of each pair of corresponding front and rear legs 51 and 49, respectively, are pivotally connected together by flexible links 52 which are illustrated as being chains.

When the cultivator 15 is in its operating position, as shown in FIGS. 3 and 4, the piston rod 46 is extended to provide for the rock arms 39 being projected in substantially horizontal positions from the rock shaft 38. The cultivator frame 21 is thus supported on the pivots 41 for up and down pivotal movement in response to the travel of the gauge wheel assembly 34 over the ground surface.

On retraction of the piston rod 46 within the cylinder assembly 47, oil under pressure to which is supplied by a usual oil pump unit (not shown) carried on the tractor 16, the rock arms 39 are pivoted counterclockwise as viewed in FIG. 4 to provide for an initial upward pivotal movement of the rear end of the cultivator frame, with the wheel assembly 34 in a ground engaging position. On a continued retraction of the piston rod 46 the flexible links or chains 52 are drawn taut, as shown in FIG. 3, whereby to form a parallel link system with the rock arms 39 to provide for a lifting of the cultivator 15 to a transport position wherein the wheel assembly 34 is out of ground engagement and the cultivator frame 21 is in a substantially horizontal position.

It is seen therefore, that the cultivator 15, when in operation, is pivotally movable about the pivots 41 relative to the tractor frame so that adjustment of the burner units 24, 26 and 27 relative to the ground surface is maintained by the ground following action of the gauge wheel assembly 34. Stated otherwise, the cultivator has an up and down floating action relative to the tractor which takes place in response to the ground travel of the wheel assembly. When the cultivator 15 is to be moved about the headlands at the end of a row, or is to be transported, it is elevated by retraction of the piston rod 46 to its horizontally extended position shown in FIG. 3.

As shown in FIG. 2, the cultivator frame 21 has secured thereto a pair of longitudinally spaced transversely extended front and rear cross bars 53 and 54, respectively, with the front cross bar 33 located substantially at the junction of the converging front sections 32 with the cultivator frame side members 28 and 29. Spaced longitudinally of the cross bars 53 and 54 are pairs of vertically adjustable downwardly extended hanger members 56 and 57 for supporting heat deflector plates 58. The hangers 56 are carried on the front cross bar 53 with the hangers 57 on the rear cross bar 54 being located directly rearwardly of corresponding front hangers 56. As best appears in FIG. 1 there is a pair of hanger members 56 and 57 for each deflector plate 58.

The deflector plates 58 are formed of a heavy plate material and are of a rectangular shape in plan view with each plate located between adjacent rows in a covering relation with the row middle or central portion of the ground surface 60 located between such adjacent rows. A deflector plate 58 is about twenty-four inches long and twenty inches wide so as to leave between adjacent deflector plates (FIG. 8) a strip about ten inches wide that is extended about five inches to each side of a row crop 65. Each air curtain, indicated at 70, formed by the air supply duct system 22 is projected across this ten inch wide strip over a length coextensive with the length of the deflector plates 58.

The air duct system 22 (FIGS. 1 and 7) includes a header or manifold duct 59 extended transversely of and suitably carried on the cultivator main frame 21 at a position between the cross bars 53 and 54. Projected downwardly from the header duct 59 and corresponding to the heat deflector plates 58 are air feeder ducts 61. The lower end 62 of each feeder duct 61 is closed and terminates above and adjacent to the upper surface of a corresponding deflector plate 58. A pair of the feeder ducts 61 are arranged opposite each other transversely of a row crop 65, with the lower end portion of each feeder duct 61 being of a shape and of a cross sectional area substantially equal to the shape and surface area of a corresponding deflector plate 58.

Figure 7:
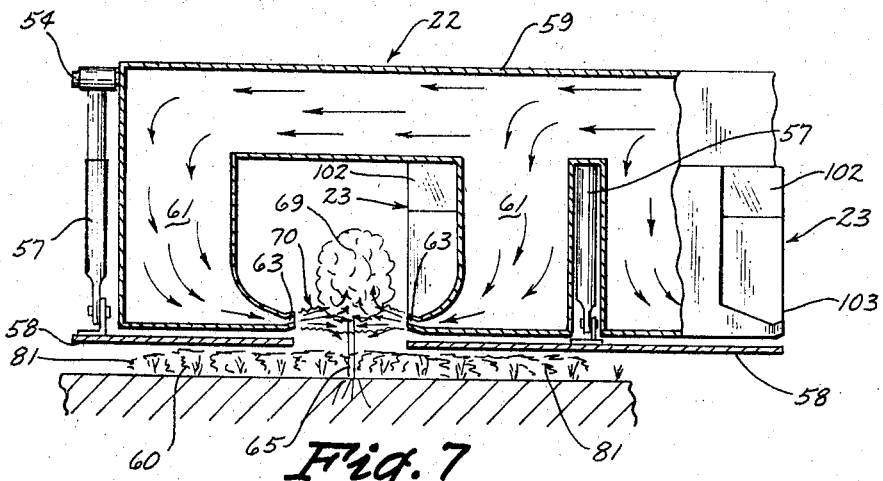
FIG. 7 is a sectional view on line 7—7 in FIG. 5.
Figure 8:
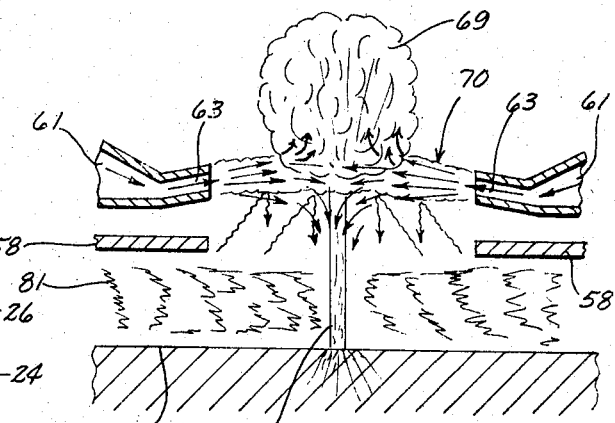
FIG. 8 is a diagrammatic view showing the relation of the air curtain relative to the plants in a row.

The opposite lower edges of each pair of transversely opposite feeder ducts 61 (FIGS. 7 and 8) are formed with elongated air discharge slots or nozzles 63. Each discharge slot 63 is thus located adjacent the side edge of a corresponding deflector plate 58 and is substantially coextensive in length with such deflector plate. A slot 63 may be adjustable in width from about three-eighths of an inch to one inch. As shown in FIGS. 7 and 8, the nozzles or discharge slots 63 are inclined upwardly relative to a horizontal plane at an angle of about ten degrees. To provide for a balanced distribution of air at the nozzles 63, the air feeder ducts 61 may be equipped with suitable dump valves (not shown).

Air under pressure is supplied to the header duct 59 (FIG. 1) by a blower unit 64 having an inlet 66 and an outlet 67 connected with the header duct 59 at the central portion thereof. The blower 64 is operated by a power unit 68, illustrated in FIG. 1 as a gasoline engine, mounted on the cultivator frame 21 in a drive relation with the blower 64.

The air from oppositely arranged nozzles 63, as shown in FIGS. 7 and 8, is discharged in a long narrow stream in a direction to strike the plants 69 in a row at substantially the base of the lower most leaves in the leaf portions of the plants. The two jets or air streams comprising an air curtain 70 are thus blown one against the other and meet or strike each other in the immediate region of the row crop 65. This coming together of the oppositely directed air streams results in the forming of upwardly and downwardly directed air currents at the row crop for a purpose to appear later.

The burner units 24, 26 and 27 are carried forwardly of the heat deflector plates 58. With reference to FIG. 1 it is seen that each front hanger member 56 has secured thereto at an intermediate position a forwardly projected cylindrical rod or tool 71 on which is adjustably supported for movement longitudinally thereof a sleeve member 72. A longitudinally adjusted position is maintained by a usual friction screw (not shown) that is threadable within the sleeve member 72 for bearing engagement with the tube 71. Attached to the lower portion of each sleeve member 72, with the axis thereof normal to the axis of the first or main sleeve member 72, is an auxiliary or second sleeve member 73 that rotatably carries a transversely extended cylindrical rod or tube member 74.

Spaced longitudinally on a rod member 74 are sleeve bearings 76 each of which carries in a perpendicular or right angle relation a corresponding burner supporting sleeve bearing 77. Each burner supporting sleeve bearing 77 has extended therethrough an upright cylindrical rod or tube 78 to the lower end of which is pivotally connected at 79 an upright leg 80 secured to each of the burners 24, 26 and 27.

It is seen therefore, that a rod member 78 is rotatably and vertically adjustable within a sleeve member 77; the sleeve bearings 76 are rotatably and longitudinally adjustable relative to a transverse rod member 74; a rod member 74 is rotatably and longitudinally adjustable relative to an associated rod 71; and the burners 24, 26 and 27 are pivotally adjustable for up and down movement relative to the pivot connections 79. By virtue of these adjustments the burner units are capable of adjustment to direct the flames therefrom in a desired direction relative to the ground surface and to the plants in a row crop.

The burner units 24, 26 and 27 (FIGS. 4 and 5) are located forwardly of the deflector plates 58 for projecting the flames 81 therefrom below an associated deflector plate. The burner units 24 and 27 are arranged at opposite sides of a row 65, with the flames 81 therefrom directed downwardly and in a rearwardly diverging relation towards the base portions of the plants 69 in a row 65. When thus directed the flames and heat therefrom will travel or be dispersed generally longitudinally of the row as the cultivator 15 is advanced adjacent the rows. Each adjacent corresponding pair of burners 24 and 27 thus functions primarily to flame cultivate the ground regions immediately adjacent to or within a row 65.

A burner unit 26 is located at the row middle between adjacent rows 65 with its flame 81 directed downwardly and rearwardly for travel longitudinally of and below a corresponding deflector plate 58. A burner unit 26 thus functions primarily to flame cultivate the row middle.

It is seen, therefore, that each deflector plate 58 is operatively associated with a corresponding cluster of burners 24, 26 and 27 arranged forwardly therefrom, with each cluster positioned between adjacent row crops 65. The burner units 24 and 27, within a cluster of burner units, are arranged in a rearwardly diverging relation. As a result adjacent burner units 24 and 27 in adjacent burner clusters are arranged in a rearwardly converging relation to cooperate in cultivating the ground portions adjacent to or within a row 65.

In use the gauge wheel assembly 34 is vertically adjusted so that with the rock arms 39 horizontally extended, in response to an extension of the piston rod 46, the cultivator frame 21 is supported in a substantially horizontal position as shown in FIG. 4. The hangers 56 and 57 are then vertically adjusted to provide for the location of the deflector plates 58 at positions adjacent to the lower ends of the ducts 61 and at a desired height above the ground surface 60. The burner units 24, 26 and 27 are then adjusted to their relative positions shown in FIGS. 5 and 6, with adjacent pairs of burner units 24 and 27 at opposite sides of a row 65 directed downwardly and in a rearwardly converging relation to project the flames 81 therefrom rearwardly about the base of the plants 69 at the ground surface 60. The burner units 26, as previously described, are directed rearwardly and downwardly to project the flames therefrom down a row middle. With the burner units and blower unit 64 in operation the cultivator 15 is advanced along the plant rows 65 by the tractor 16.

Figure 9:
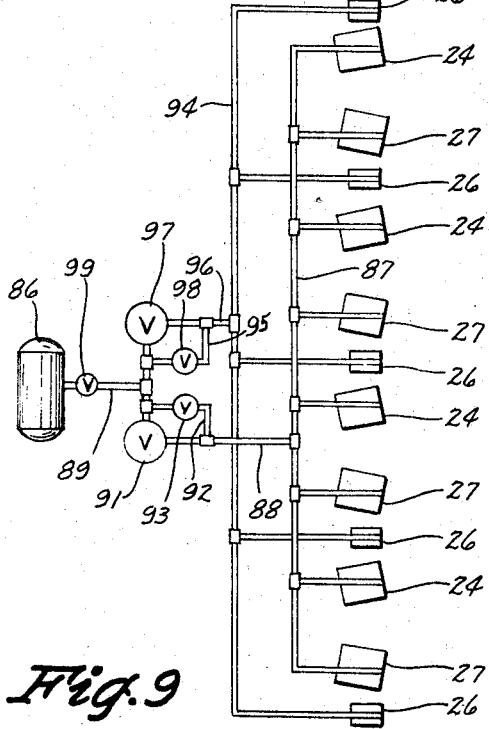
FIG. 9 is a schematic showing of the gas system for the burner units.

As illustrated particularly in FIGS. 1 and 9 the flame cultivator 15 is adapted for four row cultivation with three clusters of the burner units 24, 26 and 27 being located between end burner clusters comprised of only two burners, namely, a row middle burner 26 and a burner 24 or 27.

The heat developed by the burners is concentrated below the deflector plates 58 to effectively flame cultivate the weeds located between adjacent plant rows 65. The heat moving inwardly and upwardly between adjacent deflector plates 58 at opposite sides of a row 65 is concentrated about the base of plants by the air curtain 70 that is extended between and above the deflector plates 58 as best illustrated in FIGS 7 and 8. Although the pair of burners 24 and 27 at opposite sides of a plant row 65 are directed downwardly and rearwardly in a converging relation, the motion of the gas or heat in the flame is in a direction substantially parallel to the row or at right angles to the flow of air from the discharge nozzles 63.

As previously mentioned the air streams discharged from oppositely arranged pairs of the nozzles 63 are directed at an angle of about ten degrees relative to a horizontal plane to blow into each other at substantially the base of the lowermost leaves of the plants 69. This head on meeting of the air streams effects resultant upward and downward air currents in the immediate region of the row crop as illustrated by arrows in FIGS. 7 and 8. The upward air currents tend to lift the leaves of the plants 69 out of the heated region located below the air curtain 70 concurrently with cooling the leaves.

The magnitude of the effects of the upward and downward air currents in the plant row 65 can be relatively varied by varying the pressure of the air discharged from the nozzles 63, the angle of inclination of the nozzles 63 to the horizontal, the pressure of the gas applied to the burner units and the angle of convergence of the pairs of rearwardly converging burners 24 and 27.

With an increase in the pressure of air to the nozzles 63 the velocity of the downward air currents is increased resulting in a greater cooling in the area about the plant stems, namely, the area between the flames projecting from the converging pairs of burners 24 and 27. By tilting the nozzles 63 upwardly above an angle of ten degrees to the horizontal the upward air currents are increased with a corresponding decrease in the downward air currents resulting in a merging of the flames 81 from the converging pairs of burners 24 and 27 in the row area. Increasing the pressure of the gas supplied to the burners results in their projecting stronger flames that provide for a greater penetration of heat within the plant row. Adjusting such pairs of burners toward the plant row therebetween produces a similar effect.

It is seen therefore, that a wide latitude in heat concentration over the weed areas and protection of the plants 69 from such heat concentration is obtained to provide for an efficient flame weeding of plants of different types and at varying stages of growth. Most satisfactory results are obtained when the concentrated heat below an air curtain 70 is at a temperature of above nine hundred degrees Fahrenheit with a resultant temperature above the air curtain 70 of between three hundred degrees Fahrenheit to five hundred degrees Fahrenheit. At these temperatures the tractor 16 was advanced at a speed of about four miles an hour so that the plant leaves were subjected to the heat of between three hundred degrees Fahrenheit to five hundred degrees Fahrenheit for a time interval of from about four-tenths to six-tenths of a second.

The burners 24 and 27 were FC115 burners purchased from Goetcher Manufacturing Company of Clarksdale, Miss., and the burners 26 were D110 junior liquid burners purchased from the Arkansas Foundry Company of Little Rock, Ark. The nozzles 63 were twenty-four inches long, adjusted to about a three-eighth inch width and directed upwardly at an angle of about ten degrees to the horizontal.

The gas control system for the burner units (FIG. 9) includes a source of gas under pressure, illustrated as a tank 86, which as shown in FIG. 3 may be carried on the rear end of the tractor 16. A header line 87 for the burner units 24 and 27 is connected through a line 88 with a main supply line 89 from the tank 86. Connected in the line 88 is a pressure regulator and shut off valve 91, with a bypass line 92 being connected in the line 88 about the pressure regulator and shut off valve 91. A pilot flame bypass valve 93 is connected in the bypass line 92.

In turn a header line 94 for the burners 26 is connected to the main supply line 89 through a line 96 in which is connected a pressure regulator and shutoff valve 97. A pilot flame bypass valve 98 is connected in a bypass line 95 for the valve 97. A main valve 99 for controlling the supply of gas to the burners 24, 26 and 27 is connected in the main supply line 89.

To minimize any damage to the plants 69 or to the tractor 15 from the residual heat passing under the deflecting plates 58 and tending to trail the cultivator, such residual heat is picked up by the exhaust duct assembly 23 and discharged laterally to opposite sides of the tractor 16. The exhaust duct assembly 23 is formed with a transversely extended manifold duct 101 that is supported on the cultivator frame 21 rearwardly of and in a parallel relation with the header duct 59 of the air supply duct system 22. The ends of the manifold duct 101 are open and project laterally outwardly beyond the tractor 16, at a height above the plants 69.

Projected downwardly from the manifold duct 101 (FIGS. 1 and 4) are a plurality of exhaust or pick up ducts 102 corresponding in number to and located rearwardly of the three center deflector plates 58. Each duct 102 is open at its lower end 103 which is inclined upwardly and forwardly. The front wall 104 of a duct 102 (FIGS. 4 and 5) is closely adjacent the rear wall 106 of an adjacent air supply duct 61, with the spacing between the walls 104 and 106 being on the order of about one-half inch.

Pivotally supported at 107 (FIG. 4) at the lower edge of the rear wall 108 of the duct opening 103 and extended transversely over the full width of the rear wall 108 is a metal flap or heat collector 109. The flap 109 is of an arcuate shape with the concave surface thereof adapted to ride along the ground surface 60. The heat collector 109 thus travels in a trailing relation with a corresponding heat pick up duct 102. The rear end of the heat collector 109 is connected to one end of a chain 111 the opposite end of which is connected at 112 to the manifold duct 101.

With the cultivator 15 in its operating position the heat collector member 109 is adapted to follow the contour of the ground surface 60 to provide for the collecting of the residual heat from the burner flames 81 and the directing of such heat upwardly into the inlet or lower end of a pick up duct 102 for exhaust from the open ends of the manifold duct 101. When the cultivator 15 is raised to its transport position, shown in FIG. 3, the chain 111 prevents a downward pivotal movement of the collector member 109 to provide for the raising thereof, with the cultivator frame 21, to an elevated position above the ground surface 60.

Although the invention has been described and illustrated with respect to a preferred embodiment thereof it is to be understood that it is not to be so limited since changes and modifications can be made therein which are within the full intended scope of the invention as defined by the appended claims.

I claim:

1. The method of flame cultivating row crops comprising:
   (a) directing streams of air extended longitudinally of a row of plants toward each other from opposite sides of the row,
   (b) directing flames toward each side of a row for projection below said air streams,
   (c) controlling the direction of said oppositely directed air streams so that the air streams meet at substantially the base of the lowermost leaves of a plant,
   (d) controlling the direction of the projected flames to converge about the plant stems at a position adjacent the ground surface, and
   (e) advancing the air streams and flames simultaneously along a row.

2. The method of flame cultivating row crops comprising:
   (a) directing streams of air extended longitudinally of the row of plants toward each other from opposite sides of a row,
   (b) directing flames to each side of a row in a direction substantially longitudinally of a row from a position forwardly of and below said air streams,
   (c) controlling the direction of said oppositely disposed air streams so that the air streams meet at substantially the junction of the lowermost leaves of the plants with the plant stems,
   (d) controlling the direction of the flames to converge about the plant stems at positions adjacent the ground surface, and
   (e) advancing the air streams and flames simultaneously along the row.

3. The method of flame cultivating row crops comprising:
   (a) providing an air curtain extended longitudinally of a row of plants comprising air streams directed toward each other from opposite sides of a row in the region of the lowermost leaves of said plants,
   (b) directing flames toward each side of a row for projection below said air curtain,
   (c) providing a concentration of the heat from said flames in a desired zone relative to the plants in a row by relatively controlling the direction and heat intensity of said flames, and
   (d) controlling the rate of advance of said air curtain and flames along a row relative to the heat intensity of said flames.

4. The method of flame cultivating row crops comprising:
   (a) providing an air curtain extended longitudinally of a row of plants comprising air streams directed toward each other from opposite sides of a row in the region of the lowermost leaves of said plants,
   (b) directing flames to each side of a row in a rearward direction substantially longitudinally of a row from a position forwardly of and below said air curtain,
   (c) providing a concentration of the heat from said flames in a desired zone relative to the plants in a row by controlling the direction and velocity of the air streams and the direction and heat intensity of said flames, and
   (d) controlling the rate of advance of said air curtain and flames along a row relative to the heat intensity of said flames.

5. The method of flame cultivating row crops according to claim 4 including:
   (a) directing a flame in a rearward direction for projection downwardly along a row middle, and
   (b) deflecting the heat from said flame against the ground surface at said row middle.

6. In a cultivator for cultivating row crops by the flame method, comprising:
   (a) a portable frame adapted to travel along adjacent plant rows,
   (b) a pair of burners disposed along opposite sides of each row,
   (c) means adjustably supporting said pairs of burners adjacent the forward end of said portable frame to provide for the projection of flames rearwardly therefrom in a converging relation about the base of the plants in a row,
   (d) means providing an air curtain over a row at a position rearwardly of said burners comprising a pair of air discharge nozzles supported on said frame at opposite sides of a row, each nozzle having an elongated discharge opening extended longitudinally of a row at an elevation substantially level with the base of the lowermost leaves of the plants in a row to direct air under pressure transversely of a row such that the air discharged from said pair of nozzles meets at the plants in a row, and
   (e) a source of air supply on said frame for supplying air under pressure to said nozzles.

7. In a cultivator for cultivating row crops by a flame method as defined in claim 6, including:
   (a) a horizontal heat deflecting plate mounted on said frame at a position extended between and below adjacent nozzles located between adjacent rows of plants, said deflecting plate being of a length longitudinally of a row coextensive with the length of said nozzles, and
   (b) a burner corresponding to a heat deflecting plate mounted adjacent the front end of said frame at a position intermediate adjacent rows of plants for directing the flame therefrom rearwardly and downwardly beneath a corresponding heat deflecting plate.

8. In a cultivator for cultivating row crops by a flame method as defined in claim 6, wherein:
(a) each nozzle is directed upwardly from a horizontal plane at an angle of about ten degrees to provide for the lifting of the lowermost leaves of a plant above said air curtain by the air discharged therefrom.

9. In a cultivator for cultivating row crops by a flame method as defined in claim 6, including:
(a) a tractor having a main frame,
(b) means movably supporting one end of the said portable frame on one end of said main frame for movement to a first elevated position wherein the portable frame is extended substantially horizontally from said one end of the main frame and to a second position wherein the opposite end of the portable frame is pivotally movable for up and down movement relative to said one end of the main frame,
(c) a ground engaging wheel assembly, and
(d) means supporting said wheel assembly on said opposite end of the portable frame for vertical adjustment relative to the portable frame to initially provide for the portable frame being horizontally extended in the second position therefor, and for the pivotal up and down movement of said opposite end of the portable frame in response to the travel of the wheel assembly over the ground surface.

References Cited

UNITED STATES PATENTS

| | | | |
|---|---|---|---|
| 600,106 | 3/1898 | White et al. | 47—1.44 XR |
| 954,629 | 4/1910 | Hebert | 43—144 |
| 1,799,035 | 3/1931 | Benien et al. | 126—271.2 |
| 2,904,032 | 9/1959 | Stanton | 126—271.2 |
| 3,223,079 | 12/1965 | Keusder et al. | 126—271.2 |
| 3,341,970 | 9/1967 | Bailey | 47—1.7 |

FOREIGN PATENTS 326,093   1/1958   Switzerland.

ROBERT E. BAGWILL, Primary Examiner

U.S. Cl. X.R.

43—144; 126—271.2; 239—290